(12) United States Patent
Wu

(10) Patent No.: US 11,043,234 B2
(45) Date of Patent: Jun. 22, 2021

(54) SPIN TRANSFER TORQUE OSCILLATOR (STO) WITH SPIN TORQUE INJECTION TO A FLUX GENERATING LAYER (FGL) FROM TWO SIDES

(71) Applicant: Headway Technologies, Inc., Milpitas, CA (US)

(72) Inventor: Yan Wu, Cupertino, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 16/546,387

(22) Filed: Aug. 21, 2019

(65) Prior Publication Data

US 2021/0056987 A1 Feb. 25, 2021

(51) Int. Cl.
*G11B 5/235* (2006.01)
*G11B 5/31* (2006.01)
*G11B 5/127* (2006.01)
*G11B 5/11* (2006.01)
*G11B 5/48* (2006.01)
(Continued)

(52) U.S. Cl.
CPC .......... *G11B 5/3146* (2013.01); *G11B 5/1278* (2013.01); *G11B 5/235* (2013.01); *G11B 5/314* (2013.01); *G11B 5/11* (2013.01); *G11B 5/193* (2013.01); *G11B 5/484* (2013.01); *G11B 2005/0024* (2013.01)

(58) Field of Classification Search
None
See application file for complete search history.

(56) References Cited

U.S. PATENT DOCUMENTS 6,785,092 B2  8/2004  Covington et al.
6,809,899 B1  10/2004  Chen et al.
(Continued)

FOREIGN PATENT DOCUMENTS

JP  2002-133610  5/2002
JP  2002-298309  10/2002
(Continued)

OTHER PUBLICATIONS

PTO Office Action, U.S. Appl. No. 12/964,202, Applicant: Sasaki et al., Notification dated Nov. 28, 2012, 11 pages.
(Continued)

*Primary Examiner* — Craig A. Renner
(74) *Attorney, Agent, or Firm* — Saile Ackerman LLC; Stephen B. Ackerman

(57) ABSTRACT

A spin torque reversal assisted magnetic recording (STRAMR) structure is disclosed wherein a spin torque oscillator (STO) is formed in the write gap (WG) and generates one or both of a radio frequency (RF) field on a magnetic bit to lower the required write field during a write process, and a spin torque on a field generation layer (FGL) in the STO that flips a FGL magnetization to a direction opposing the WG field thereby increasing reluctance in the WG and causing larger write field output from the main pole (MP). The FGL is between two spin preserving layers that each conduct spin polarized current from an adjoining spin polarization (SP) layer. Current is applied from the MP and trailing shield to the SP layers, and returns to a direct current source through a lead from the FGL. STO sidewalls are self-aligned to a MP tip upper portion.

15 Claims, 13 Drawing Sheets

(51) Int. Cl.
*G11B 5/193* (2006.01)
*G11B 5/00* (2006.01)

(56) References Cited

U.S. PATENT DOCUMENTS

| | | | |
|---|---|---|---|
| 6,954,340 | B2 | 10/2005 | Shukh et al. |
| 7,009,812 | B2 | 3/2006 | Hsu et al. |
| 7,589,600 | B2 | 9/2009 | Dimitrov et al. |
| 7,724,469 | B2 | 5/2010 | Gao et al. |
| 7,835,111 | B2 | 11/2010 | Flint et al. |
| 7,957,098 | B2 | 6/2011 | Yamada et al. |
| 7,963,024 | B2 | 6/2011 | Neuhaus |
| 7,978,442 | B2 | 7/2011 | Zhang et al. |
| 7,982,996 | B2 | 7/2011 | Smith et al. |
| 8,027,110 | B1 | 9/2011 | Yamanaka et al. |
| 8,064,244 | B2 | 11/2011 | Zhang et al. |
| 8,068,312 | B2 | 11/2011 | Jiang et al. |
| 8,154,825 | B2 | 4/2012 | Takashita et al. |
| 8,203,389 | B1 | 6/2012 | Zhou et al. |
| 8,264,792 | B2 | 9/2012 | Bai et al. |
| 8,270,112 | B2 | 9/2012 | Funayama et al. |
| 8,295,008 | B1 | 10/2012 | Sasaki et al. |
| 8,310,787 | B1 | 11/2012 | Sasaki et al. |
| 8,320,079 | B2 | 11/2012 | Iwasaki et al. |
| 8,427,781 | B1 | 4/2013 | Sasaki et al. |
| 8,446,690 | B2 | 5/2013 | Alex et al. |
| 8,462,461 | B2 | 6/2013 | Braganca et al. |
| 8,477,452 | B2 | 7/2013 | Sasaki et al. |
| 8,493,687 | B2 | 7/2013 | Sasaki et al. |
| 8,582,240 | B1 | 11/2013 | Chen et al. |
| 8,582,241 | B1 | 11/2013 | Yu et al. |
| 8,604,886 | B2 | 12/2013 | Nikonov et al. |
| 8,634,163 | B2 | 1/2014 | Tanabe et al. |
| 8,749,919 | B2 | 6/2014 | Sasaki et al. |
| 8,767,347 | B1 | 7/2014 | Sasaki et al. |
| 8,792,210 | B2 | 7/2014 | de la Fuente et al. |
| 9,142,228 | B2 | 9/2015 | Fujita et al. |
| 9,230,571 | B1 | 1/2016 | Chen et al. |
| 9,275,672 | B2 | 3/2016 | Shiroishi et al. |
| 9,299,367 | B1 | 3/2016 | Tang et al. |
| 9,361,912 | B1 | 6/2016 | Liu et al. |
| 9,406,317 | B1 | 8/2016 | Tang et al. |
| 9,466,319 | B1 | 10/2016 | Tang et al. |
| 9,805,746 | B1 | 10/2017 | Okamura et al. |
| 9,824,701 | B2 | 11/2017 | Tang et al. |
| 9,934,797 | B2 | 4/2018 | Takahashi et al. |
| 9,966,091 | B2 | 5/2018 | Chen et al. |
| 9,978,404 | B2 | 5/2018 | Taguchi et al. |
| 10,032,469 | B2 | 7/2018 | Lim et al. |
| 10,037,772 | B2 | 7/2018 | Okamura et al. |
| 10,121,497 | B1 | 11/2018 | Takahashi et al. |
| 10,210,888 | B1 | 2/2019 | Li et al. |
| 10,366,714 | B1 | 7/2019 | Olson et al. |
| 10,522,174 | B1 | 12/2019 | Chen et al. |
| 10,546,600 | B1 | 1/2020 | Koizumi et al. |
| 10,559,318 | B1 | 2/2020 | Chen et al. |
| 10,580,441 | B1 | 3/2020 | Chen et al. |
| 10,699,731 | B1 | 6/2020 | Wu |
| 10,762,917 | B1 | 9/2020 | Le et al. |
| 10,839,831 | B1 | 11/2020 | Nguyen et al. |
| 2002/0034043 | A1 | 3/2002 | Okada et al. |
| 2004/0150910 | A1 | 8/2004 | Okada et al. |
| 2005/0128637 | A1 | 6/2005 | Johnston et al. |
| 2005/0141137 | A1 | 6/2005 | Okada et al. |
| 2006/0044682 | A1 | 3/2006 | Le et al. |
| 2006/0087765 | A1 | 4/2006 | Iwakura et al. |
| 2006/0103978 | A1 | 5/2006 | Takano et al. |
| 2007/0177301 | A1 | 8/2007 | Han et al. |
| 2008/0013209 | A1 | 1/2008 | Sasaki et al. |
| 2008/0088972 | A1 | 4/2008 | Sasaki et al. |
| 2009/0059426 | A1 | 3/2009 | Sasaki et al. |
| 2009/0080106 | A1 | 3/2009 | Shimizu et al. |
| 2009/0128953 | A1 | 5/2009 | Jiang et al. |
| 2009/0296275 | A1 | 12/2009 | Sasaki et al. |
| 2010/0165517 | A1 | 7/2010 | Araki et al. |
| 2011/0211271 | A1 | 9/2011 | Ng et al. |
| 2011/0216447 | A1 | 9/2011 | Li et al. |
| 2012/0262821 | A1 | 10/2012 | Taguchi et al. |
| 2012/0292723 | A1 | 11/2012 | Luo et al. |
| 2012/0307404 | A1* | 12/2012 | Braganca et al. ... G11B 5/3903 360/245.8 |
| 2013/0062308 | A1 | 3/2013 | Funayama et al. |
| 2013/0215532 | A1 | 8/2013 | Taguchi et al. |
| 2014/0071562 | A1 | 3/2014 | Chen et al. |
| 2014/0177092 | A1 | 6/2014 | Katada et al. |
| 2014/0313616 | A1 | 10/2014 | Kusukawa et al. |
| 2015/0043106 | A1 | 2/2015 | Yamada et al. |
| 2015/0098150 | A1 | 4/2015 | Chiu et al. |
| 2016/0035375 | A1 | 2/2016 | Gao |
| 2016/0218728 | A1 | 7/2016 | Zhu |
| 2017/0133044 | A1 | 5/2017 | Lim et al. |
| 2017/0309301 | A1 | 10/2017 | Takahashi et al. |
| 2018/0075868 | A1 | 3/2018 | Koui et al. |
| 2019/0088275 | A1 | 3/2019 | Narita et al. |
| 2019/0244635 | A1 | 8/2019 | Goncharov et al. |
| 2019/0279666 | A1 | 9/2019 | Freitag et al. |
| 2020/0152228 | A1 | 5/2020 | Tang et al. |
| 2020/0176022 | A1 | 6/2020 | Li et al. |
| 2020/0312354 | A1 | 10/2020 | Wu et al. |
| 2020/0381012 | A1 | 12/2020 | Chembrolu |

FOREIGN PATENT DOCUMENTS

| | | |
|---|---|---|
| JP | 2008-021398 | 1/2008 |
| JP | 2010-157303 | 7/2010 |

OTHER PUBLICATIONS

"The Feasibility of Magnetic Recording at 10 Terabits Per Square Inch on Conventional Media," by Roger Wood et al., IEEE Transactions on Magnetics, vol. 45, No. 2, Feb. 2009, pp. 917-923.

Microwave Assisted Magnetic Recording, by Jian-Gang Zhu et al., IEEE Transactions on Magnetics, vol. 44, No. 1, Jan. 1, 2008, pp. 125-131.

Nov. 13, 2012, Office Action issued in Japanese Patent Application No. 2011-149242, with English language translation, 4 pages.

Nov. 13, 2012, Office Action issued in Japanese Patent Application No. 2011-149243, with English language translation, 6 pages.

Nov. 13, 2012, Office Action issued in Japanese Patent Application No. 2011-149244, with English language translation, 6 pages.

"Spin-Torque Oscillator Based on Magnetic Tunnel Junction with a Perpendicularly Magnetized Free Layer and In-Plane Magnetized Polarizer," by Hitoshi Kubota, et al., 2013 The Japan Society of Applied Physics, Applied Physics Express 6 (2013) 103003, Sep. 27, 2013, pp. 1-3.

"High-Power Coherent Microwave Emission from Magnetic Tunnel Junction Nano-oscillators with Perpendicular Anisotropy," by Zhongming Zeng, et al, 2012 American Chemical Society, Jun. 4, 2012, vol. 6, No. 7, pp. 6115-6121.

U.S. Office Action, U.S. Appl. No. 16/781,631, Applicant: Wu et al., dated Jun. 25, 2020, 14 pages.

U.S. Office Action, U.S. Appl. No. 16/781,618, Applicant: Wu, Yan, dated Jul. 7, 2020, 14 pages.

U.S. Notice of Allowance, U.S. Appl. No. 16/781,618, First Named Inventor: Yan Wu, dated Sep. 15, 2020, 11 pages.

U.S. Notice of Allowance, U.S. Appl. No. 16/927,205, First Named Inventor: Shohei Kawasaki, dated Nov. 24, 2020, 27 pages.

U.S. Notice of Allowance, U.S. Appl. No. 16/781,631, First Named Inventor: Yan Wu, dated Nov. 23, 2020, 16 pages.

U.S. Notice of Allowance, U.S. Appl. No. 16/781,618, First named Inventor: Yan Wu, dated Jan. 12, 2021, 11 pages.

U.S. Notice of Allowance, U.S. Appl. No. 16/781,631, Applicant: Wu et al., dated Feb. 17, 2021, 11 pages.

* cited by examiner

SPIN TRANSFER TORQUE OSCILLATOR (STO) WITH SPIN TORQUE INJECTION TO A FLUX GENERATING LAYER (FGL) FROM TWO SIDES

RELATED PATENT APPLICATIONS

This application is related to the following: Ser. No. 16/209,151, filed on Dec. 4, 2018; and Ser. No. 16/563,198, filed on Sep. 6, 2019; assigned to a common assignee, and herein incorporated by reference in their entirety.

TECHNICAL FIELD

The present disclosure relates to a design for a STO device in a perpendicular magnetic recording (PMR) writer that enables a dual function of spin torque reversal assisted magnetic recording (STRAMR) wherein a FGL magnetization flips to a direction opposing the write gap (WG) field flux thereby enhancing the main pole (MP) write field as a result of spin torque from adjacent spin polarization (SP) layers on opposite sides of the FGL when a current is applied from both of the main pole (MP) and write shield (WS) and returns to a source through a lead from the FGL, and a microwave assisted magnetic recording (MAMR) effect wherein the FGL is driven into a precessional state to generate a radio frequency (RF) field on a magnetic bit to lower the write field necessary to switch the bit.

BACKGROUND

As the data areal density in hard disk drive (HDD) increases, write heads are required to be made with smaller critical dimensions in order to write media bits of smaller sizes. However, as the write head size shrinks, its writability degrades. To improve writability, new technology is being developed that assists writing to a media bit. Two main approaches currently being investigated are thermally assisted magnetic recording (TAMR) and MAMR. The latter is described by J-G. Zhu et al. in "Microwave Assisted Magnetic Recording", IEEE Trans. Magn., vol. 44, pp. 125-131 (2008). MAMR uses a spin torque device to generate a high frequency field that reduces the coercive field of a medium bit thereby allowing the bit to be switched with a lower write field.

STO devices are based on a spin-torque-transfer effect that arises from the spin dependent electron transport properties of ferromagnetic (FM1)-spacer-ferromagnetic (FM2) multilayers. When spin polarized current from the FM1 layer passes through the spacer and FM2 layer in a current perpendicular-to-plane direction, the spin angular moment of electrons incident on the FM2 layer interacts with magnetic moments of the FM2 layer near the interface between the FM2 layer and the non-magnetic spacer. Through this interaction, the electrons transfer a portion of their angular momentum to the FM2 layer. As a result, spin-polarized current can switch (flip) the FM2 magnetization direction if the current density is sufficiently high. STO devices may have FM layers with perpendicular magnetic anisotropy (PMA) where magnetization is aligned substantially perpendicular to the plane of the FM layer. However, unlike Magnetoresistive Random Access Memory (MRAM) where PMA is necessary to keep magnetization perpendicular to plane in a free layer and reference layer, for example, STO in MAMR and related applications has a sufficiently strong write gap field to align magnetization in magnetic layers without requiring inherent PMA in the FM1 and FM2 layers.

MAMR typically operates with the application of a bias current from the main pole across the STO device to a trailing shield, or vice versa, in order to apply spin torque on an oscillation layer (OL) otherwise known as a FGL so that the FGL oscillation generates a high frequency RF field. The RF field induces a precessional state and lowers coercivity in a magnetic bit to be written in a magnetic medium. Simultaneously, a write field from the main pole is applied from an air bearing surface (ABS) to the magnetic medium, and lower field strength is needed to write the bit because of the RF field assist. In STRAMR schemes such as the one described in U.S. Pat. No. 6,785,092, FGL magnetization flips to an opposite direction when the applied current is sufficiently large thereby increasing the WG reluctance, which causes a greater write field output.

Both MAMR and STRAMR typically require a relatively high current density $>10^8$ A/cm$^2$ in order to apply a useful spin torque effect for generating a RF field or for FGL flipping. High current density generally leads to device reliability issues because of electromigration in the STO device. Development efforts have focused on optimizing the total saturation magnetization (MsT) value for FM1 and FM2 layers in the STO in order to achieve improved performance. A STRAMR/MAMR design that achieves a better enhancement in writability at lower current density is needed.

SUMMARY

One objective of the present disclosure is to provide a STO device that enables one or both of a STRAMR effect on FGL magnetization to enhance the write field, and a MAMR effect using lower applied current density than existing STO designs for improved device reliability while maintaining writability.

A second objective of the present disclosure is to provide a method of forming the STO device according to the first objective.

According to the embodiments of the present disclosure, these objectives are achieved with a perpendicular magnetic recording (PMR) writer design having a STO device formed between a MP and a write shield (WS), and within a write gap (WG). A first SP layer adjoins the MP trailing side and is separated from the FGL by a first spin preserving layer (SPRL1), and a second SP layer contacts the WS bottom surface and is separated from the FGL by a second SPRL (SPRL2). A current ($I_a$) is applied from the MP and is spin polarized by the first SP layer. The spin polarized current transits SPRL1 and produces spin torque on the FGL before returning to a direct current (dc) source through a lead from the FGL. Meanwhile, current $I_b$ is applied from the WS and is spin polarized by the second SP layer. The spin polarized current transverses SPRL2 and provides spin torque on FGL magnetization before returning to the dc source through the lead from the FGL. A key feature is that the spin torque from the two SP layers is additive thereby effectively doubling the spin torque on the FGL at the same bias current density used to flip FGL magnetization with spin torque from a single SP layer in prior art designs. Alternatively, the same degree of FGL flipping is provided at half the current density of previous designs in order to substantially improve device reliability.

According to a first embodiment, the two SP layers as well as SPRL1 and SPRL2 have a front side at the ABS and a backside at a first height (h) that may be at the WS throat height (TH). The FGL has a front side at the ABS and a backside that is at a substantially greater height than the WS TH. A contact layer with a lead to a dc source is formed on a back portion of the FGL. Each of the SP layers and FGL is a single layer or a multilayer made of one or more of Co, Fe, Ni, or alloys thereof such as CoFe, NiFe, CoFeNi, or alloys with B, Pt, Pd, Ru, or Cr, or laminates of one or more of Co, Fe, and Ni with Pt or Pd including $(Fe/Pt)_n$, $(Co/Pt)_n$, $(Fe/Pd)_n$, and $(Co/Pd)_n$ where n is a lamination number. The FGL can be divided into two sub-layers and a non-magnetic material can be added between the sub-layers to improve robustness of the structure. Spin preserving layers are preferably made of Cu, Ag, Au, or Al, or an alloy thereof with Cr or Mo for improved robustness against electromigration.

SP layer and FGL magnetizations are substantially in the direction of the WG field flux in the absence of an applied current. At relatively low $I_a$ and $I_b$ current densities, each of the SP and FGL layers enters a precessional state wherein an oscillation generates a RF field on one or more magnetic bits in the magnetic medium to provide a MAMR effect during the write process. At higher $I_a$ and $I_b$ current density, FGL magnetization flips because of greater spin torque from the SP layers, and the cone angle increases with increasing current density until approaching a 180 degree angle where the MAMR effect is essentially absent. However, writability is maximized because FGL magnetization is essentially anti-parallel to the WG field flux thereby optimizing WG reluctance and the write field output from the MP.

The present disclosure also encompasses a process flow for forming a STO device described herein. The first SP, SPRL1, and a sacrificial FGL are deposited on the MP trailing side. After a photoresist patterning and etching sequence where the sacrificial FGL is partially removed, backsides are formed on the first SP and SPRL1 at height h from the eventual ABS plane, and a WG layer is deposited as a refill behind height h. Next, the FGL, SPRL2, and second SP layer are sequentially deposited on SPRL1 and the WG layer. A contact layer is formed on a back portion of the FGL using a lift-off process. Thereafter, a backside is formed on the second SP layer and SPRL2 at height h, and a second WG layer is formed on exposed portions of the FGL top surface as a refill. Next, a photoresist patterning and etching sequence is employed to form a cross-track width on the first and second SP layers, SPRL1, SPRL2, and FGL between the eventual ABS plane and height h. The etch removes a top portion of the MP trailing side and thereby self-aligns the widths of an upper MP tip portion with the STO device layers. The volume of the MP behind height h is not affected so that writability is retained.

BRIEF DESCRIPTION OF THE DRAWINGS

FIGS. 8A-9A are ABS views, and FIGS. 8B-9B and FIGS. 10-11 are down-track cross-sectional views showing a sequence of steps in forming a first SP layer and a first spin preserving layer having a backside on a MP trailing side.

FIGS. 12-14A are down-track cross-sectional views showing a sequence of forming the FGL, a second spin preserving layer, and a second SP layer on the first spin preserving layer in FIG. 11, and forming a backside on the second spin preserving layer and on the second SP layer.

DETAILED DESCRIPTION

Figure 1:
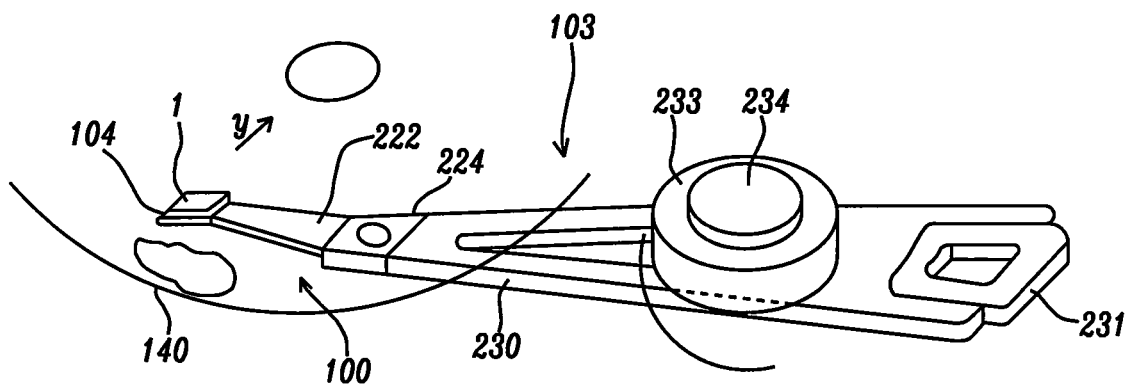
FIG. 1 is a perspective view of a head arm assembly of the present disclosure.

The present disclosure is a PMR writer having a STO device in a WG to enable both of a STRAMR effect for FGL flipping, and a MAMR effect on adjacent magnetic bits in a magnetic medium, and a process for making the same. In the drawings, the y-axis is in a cross-track direction, the z-axis is in a down-track direction, and the x-axis is in a direction orthogonal to the ABS and towards a back end of the writer structure. Thickness refers to a down-track distance, width is a cross-track distance, and height is a distance from the ABS in the x-axis direction. In some of the drawings, a magnetic bit is considerably enlarged over actual size in order to more easily depict a magnetization therein. The terms "flipping" and "switching" may be used interchangeably when referring to a change in FGL magnetization direction. A "higher degree of flipping" means FGL magnetization is flipped closer to a direction that is anti-parallel to the WG field flux and has a smaller cone angle in a precessional state. A "top" surface of a STO layer is a surface facing the WS and a "bottom" surface of a STO layer faces the MP.

Referring to FIG. 1, a head gimbal assembly (HGA) 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 2:
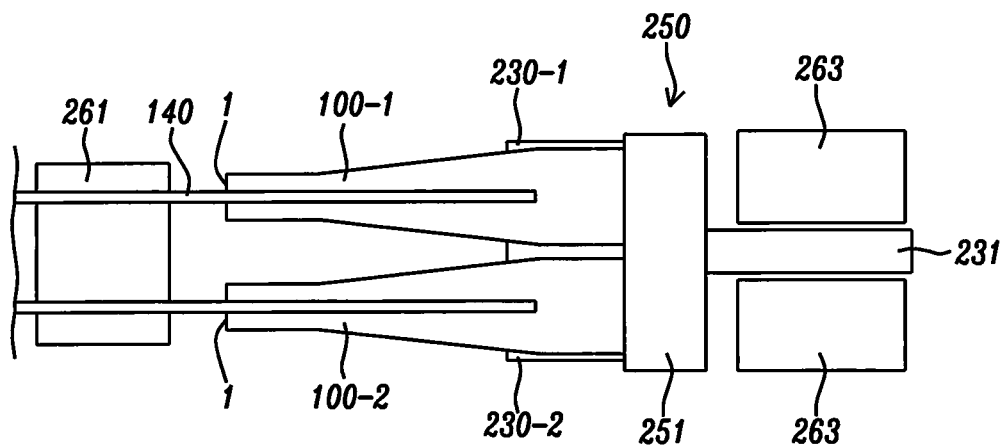
FIG. 2 is side view of a head stack assembly of the present disclosure.

Next, a side view of a head stack assembly (FIG. 2) and a plan view of a magnetic recording apparatus (FIG. 3) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 1) of the voice coil motor is mounted at the opposite side of each arm in carriage 251. The voice coil motor has a permanent magnet 263 arranged at an opposite position across the coil 231.

Figure 3:
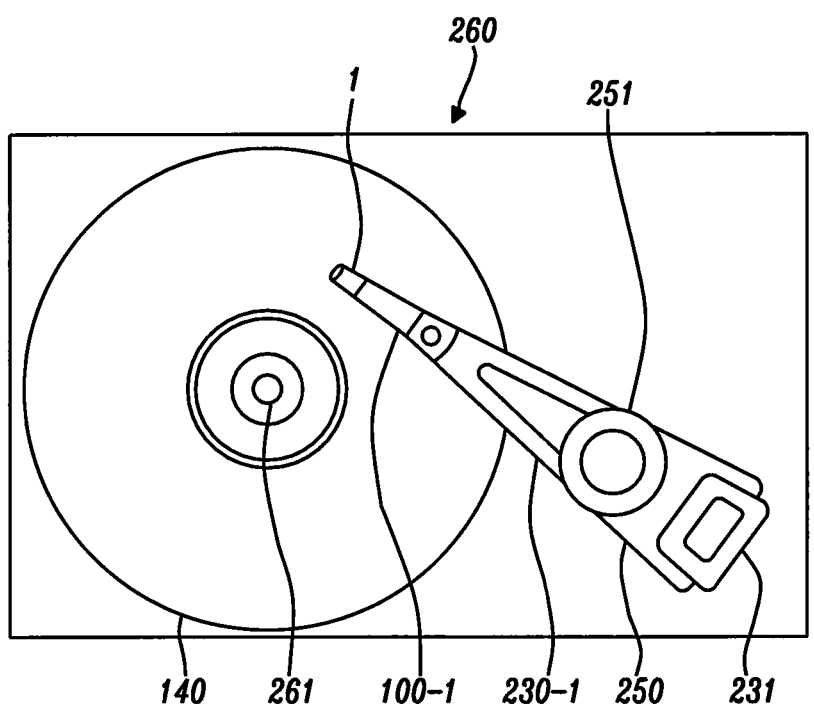
FIG. 3 is a plan view of a magnetic recording apparatus of the present disclosure.

With reference to FIG. 3, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 4:
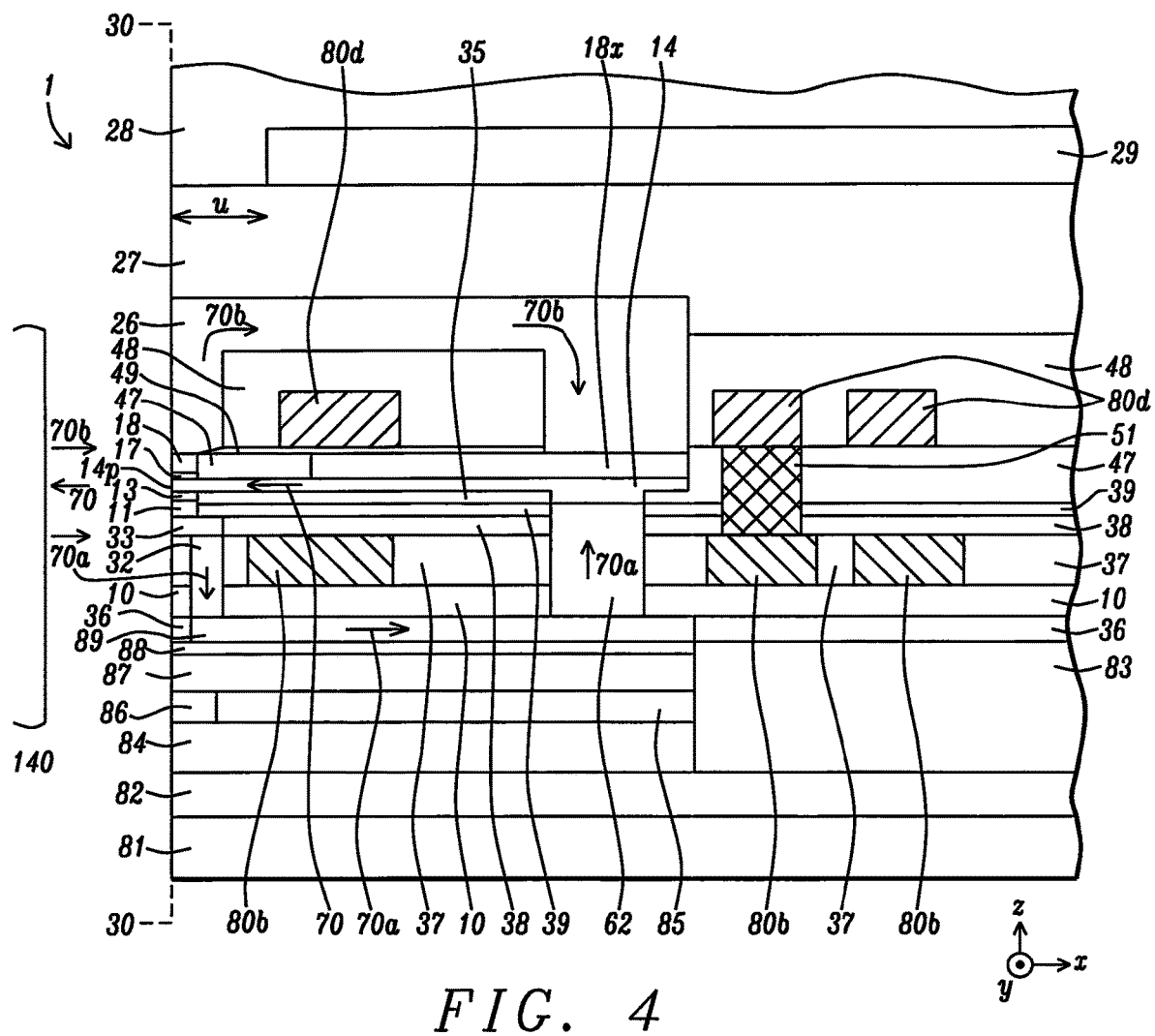
FIG. 4 is a down-track cross-sectional view of a combined read-write head with leading and trailing loop pathways for magnetic flux return to the main pole according to an embodiment of the present disclosure.

Referring to FIG. 4, magnetic recording head 1 comprises a combined read-write head. The down-track cross-sectional view is taken along a center plane (44-44 in FIG. 5A) formed orthogonal to the ABS 30-30, and that bisects MP 14. The read head is formed on a substrate 81 that may be comprised of AlTiC (alumina+TiC) with an overlying insulation layer 82 that is made of a dielectric material such as alumina. The substrate is typically part of a slider formed in an array of sliders on a wafer. After the combined read head/write head is fabricated, the wafer is sliced to form rows of sliders. Each row is typically lapped to afford an ABS before dicing to fabricate individual sliders that are used in a magnetic recording device. A bottom shield 84 is formed on insulation layer 82.

A magnetoresistive (MR) element also known as MR sensor 86 is formed on bottom shield 84 at the ABS 30-30 and typically includes a plurality of layers (not shown) including a tunnel barrier formed between a pinned layer and a free layer where the free layer has a magnetization (not shown) that rotates in the presence of an applied magnetic field to a position that is parallel or antiparallel to the pinned layer magnetization. Insulation layer 85 adjoins the backside of the MR sensor, and insulation layer 83 contacts the backsides of the bottom shield and top shield 87. The top shield is formed on the MR sensor. An insulation layer 88 and a top shield (S2B) layer 89 are sequentially formed on the top magnetic shield. Note that the S2B layer 89 may serve as a flux return path (RTP) in the write head portion of the combined read/write head. Thus, the portion of the combined read/write head structure formed below layer 89 in FIG. 4 is typically considered as the read head. In other embodiments (not shown), the read head may have a dual reader design with two MR sensors, or a multiple reader design with multiple MR sensors.

The present disclosure anticipates that various configurations of a write head may be employed with the read head portion. In the exemplary embodiment, magnetic flux 70 in MP 14 is generated with flowing a current through bucking coil 80b and driving coil 80d that are below and above the MP, respectively, and are connected by interconnect 51. Magnetic flux 70 exits the MP at pole tip 14p at the ABS 30-30 and is used to write a plurality of bits in magnetic media 140. Magnetic flux 70b returns to the MP through a trailing loop comprised of high moment trailing shield (HMTS) 17 having a saturation magnetization preferably from 19 kiloGauss (kG) to 24 kG, write shield (WS) 18, PP3 trailing shield 26, and top yoke 18x. There is also a leading return loop for magnetic flux 70a that includes leading shield 11, leading shield connector (LSC) 33, S2 connector (S2C) 32, return path 89, and back gap connection (BGC) 62. The magnetic core may also comprise a bottom yoke 35 below the main pole layer. Dielectric layers 10, 13, 36-39, and 47-49 are employed as insulation layers around magnetic and electrical components. A protection layer 27 covers the PP3 trailing shield and is made of an insulating material such as alumina. Above the protection layer and recessed a certain distance u from the ABS 30-30 is an optional cover layer 29 that is preferably comprised of a low coefficient of thermal expansion (CTE) material such as SiC. Overcoat layer 28 is formed as the uppermost layer in the write head.

In related application Ser. No. 16/209,151, we disclosed a PMR writer wherein applied current flows in one direction across a STO device, and SP layers are formed on opposite sides of the FGL to provide additive spin torque for flipping FGL magnetization. As a result, applied current density may be reduced compared with a STO design where spin torque is applied from only one side of the FGL. However, we were motivated to further optimize the STO design to achieve an even further reduction in applied current density for improved device reliability while maintaining the same degree of FGL flipping.

Figure 5A:
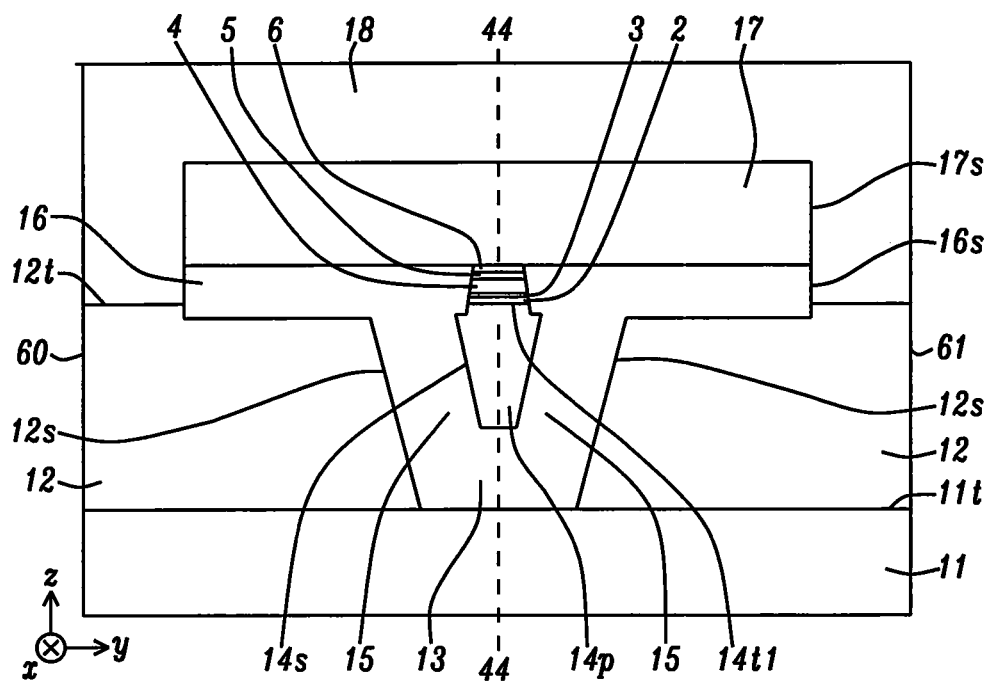
FIGS. 5A-5B are ABS views of a STO device formed in a WG and on an upper portion of the MP that has a smaller cross-track width than a bottom portion of the MP according to an embodiment of the present disclosure.

Referring to FIG. 5A, a first embodiment of an improved STO device of the present disclosure is depicted. The STO device is formed on MP tip 14p and has a stacking order where first SP layer 2, first SPRL (SPRL1) 3, FGL 4, second SPRL (SPRL2) 5, and second SP layer 6 are sequentially formed on MP trailing side 14t1. In the exemplary embodiment, there is an all wrap around (AWA) shield structure wherein side shields 12 are formed on a leading shield top surface 11t on each side of the center plane 44-44 that bisects the MP. Moreover, WS 18 contacts the top surface 12t of each side shield, and adjoins WG sides 16s as well as the top surface 17t and sides 17s of HMTS 17. Side gaps 15 separate each side shield from a MP side 14s, leading gap is between MP leading side 14b1 and leading shield 11, and WG 16 is between each side shield top surface and the WS. The AWA shield structure has far sides 60, 61 on opposite sides of the center plane, and there are inner side shield sides 12s substantially parallel to MP sides 14s.

Figure 5B:
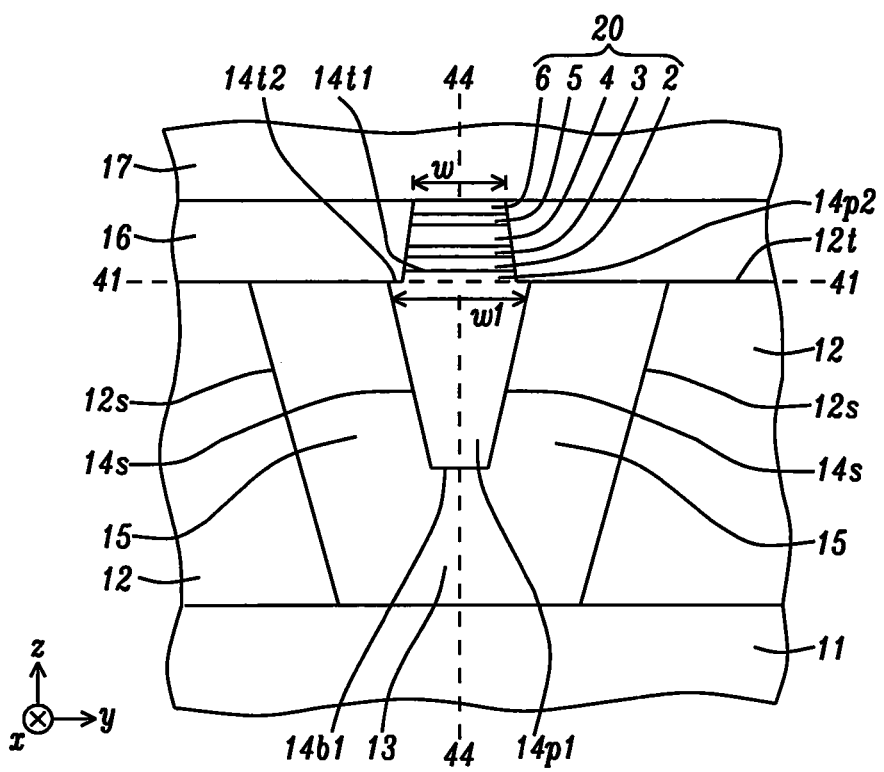

In FIG. 5B, the region around the MP tip and STO device 20 comprised of first and second SP layers 2, 6, SPRL1 3, SPRL2 5, and FGL 4 is enlarged compared with FIG. 5A. The MP tip has an upper portion 14p2 above plane 41-41 that includes side gap top surface 15t and adjacent portions of side shield top surface 12t. The MP tip upper portion has top surface 14t1 with a cross-track width essentially equal to the width w also known as the PWA of the exposed STO device layers. The lower portion 14p1 of the MP tip is below plane 41-41 and comprises sides 14s, top surface 14t2 having a width w1, where w1>w, and leading side 14b1.

Figure 6A:
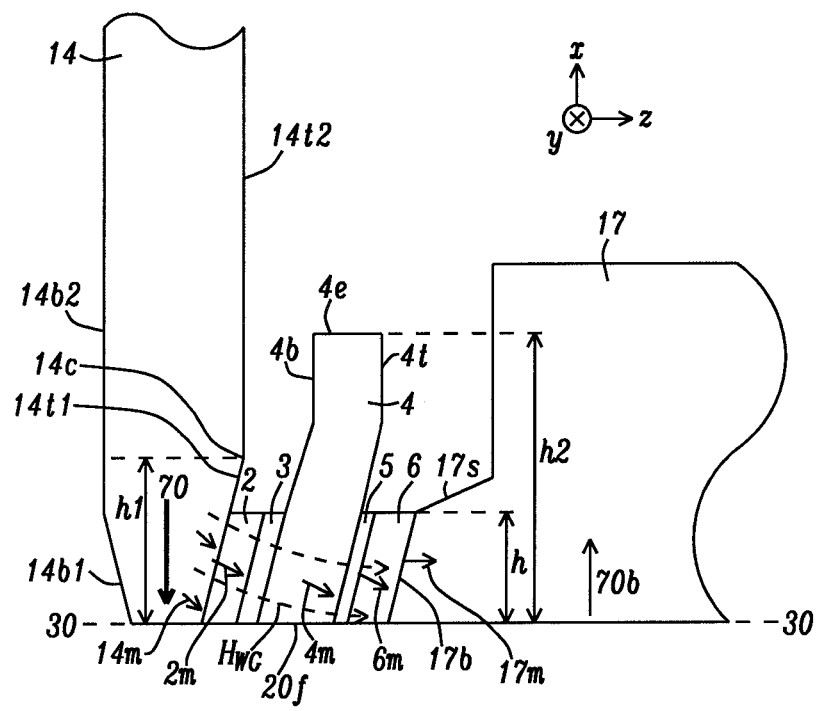
FIG. 6A is a down-track cross-sectional view of the STO device in FIG. 5A.

Referring to FIG. 6A, a down-track cross-sectional view of the writer structure in FIG. 5A is shown at center plane 44-44. In this embodiment, magnetic flux 70 in MP 14 is orthogonal to the ABS 30-30 and is directed toward a magnetic medium (not shown). Magnetic flux 70b is collected by HMTS 17 and then returns to the MP through a trailing loop (shown in FIG. 4). STO device 20 has a front side 20f at the ABS, and is formed on the MP tapered trailing side 14t1, which connects at corner 14c with a MP top surface 14t2 that is aligned orthogonal to the ABS. Corner 14c is at height h1 from the ABS. The MP leading side 14b1 is also tapered and connects with the MP bottom surface 14b2. Write gap field $H_{WG}$ is shown across the STO in a direction from the MP to WS 17. STO device layers 2, 3, 5, and 6 have a backside at height h that may be equivalent to the HMTS throat height where HMTS bottom surface 17b meets HMTS side 17s. Preferably, h<h1. FGL 4 has a bottom surface 4b and top surface 4t that are substantially conformal to the MP trailing side and MP top surface. FGL backside 4e is at height h2 where h2 is 50 nm to 1000 nm from the ABS and is substantially larger than h1.

MP 14 has local magnetization 14m proximate to MP trailing side 14t1, and HMTS 17 has a local magnetization 17m proximate to HMTS bottom surface 17b where magnetizations 14m, 17m are in the general direction of $H_{WG}$. Likewise, first and second SP magnetizations 2m, 6m, respectively, and FGL magnetization 4m are substantially in the same direction as $H_{WG}$ when write field 70 is out of the MP at the ABS 30-30, and return field 70b is into the HMTS at the ABS.

Figure 6B:
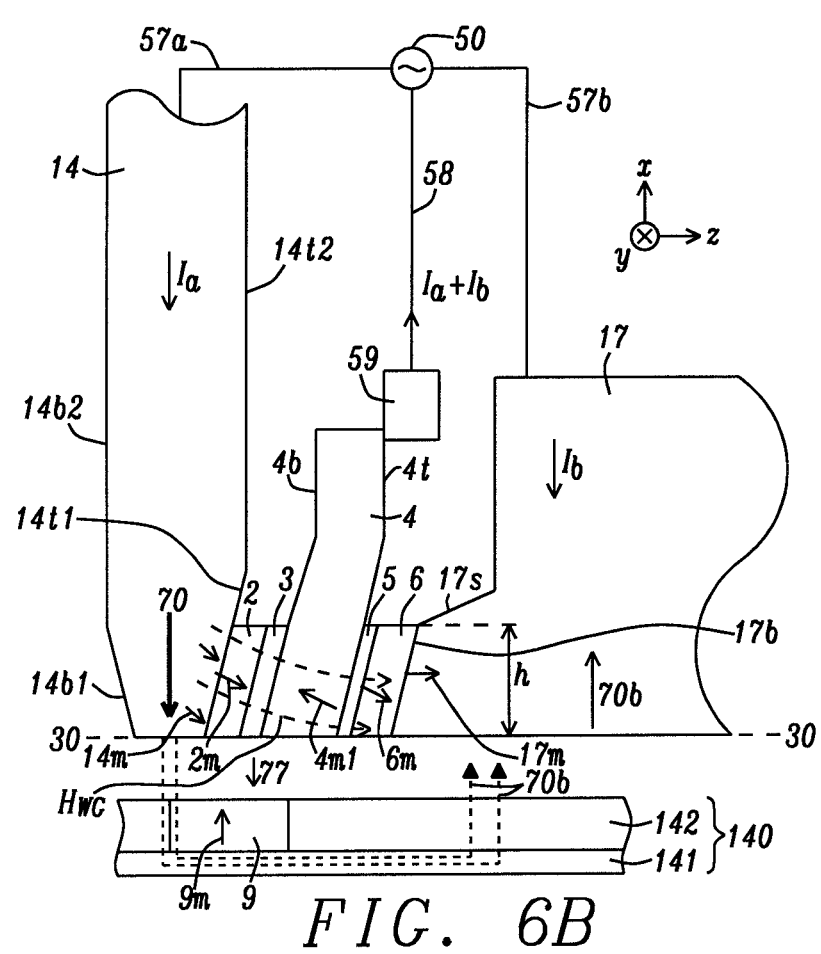
FIG. 6B illustrates how FGL magnetization in the STO flips when a current is applied across a SP layer to the FGL from both sides according to an embodiment of the present disclosure.

The advantages of the present disclosure are illustrated in FIG. 6B where dc source 50 is connected to MP 14 through lead 57a, and to HMTS 17 through lead 57b. There is also a lead 58 to the dc source from contact layer 59 that is formed on the top surface of FGL 4. Thus, when current $I_a$ is applied through lead 57a, and current $I_b$ is applied through lead 57b, and returns to the dc source through lead 58, $I_a$ from lead 57a and MP 14 is spin polarized by first SP layer 2 and transits SPRL1 3 to generate spin torque on FGL magnetization 4m proximate to the interface of the first SPRL top surface and FGL bottom surface 4b. Likewise, $I_b$ from lead 57b and HMTS 17 is spin polarized by second SP layer 6 and transits SPRL2 5 to produce spin torque on FGL magnetization 4m proximate to the interface of the second SPRL bottom surface with FGL top surface 4t. As a result of the additive spin torque from both SP layers, FGL magnetization is driven into a precessional state 4p with cone angle α (FIG. 6C), which in turn produces a radio frequency (RF) field 77 on bit magnetization 9m that is a MAMR assist where bit magnetization is driven to oscillate in a precessional state (not shown) thereby reducing a coercivity of medium bit 9 so that it can be switched using a smaller write field 70. Note that magnetic flux in the write field proceeds through the ABS 30-30 and into medium bit layer 142 and soft underlayer (SUL) 141 before return field 70b re-enters the ABS.

Figure 6C:
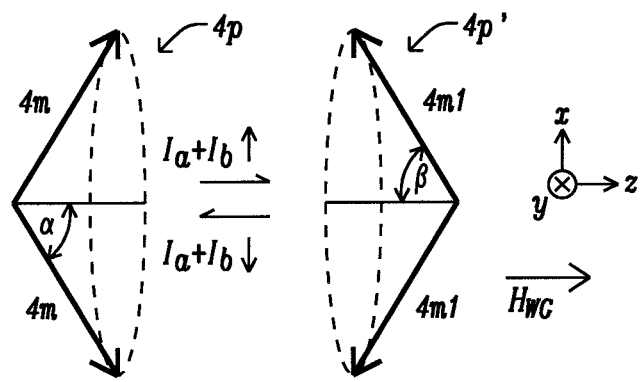
FIG. 6C illustrates a cone angle of a FGL magnetization in a precessional state that flips in a down-track direction depending on current density applied across the layer according to an embodiment of the present disclosure.

Referring to FIG. 6C, as $I_a$ current density increases, cone angle α increases until a current density magnitude is reached where magnetization 4m flips to precessional state 4p' with cone angle β wherein magnetization 4m1 is in a direction substantially opposing $H_{WG}$. As $I_a$ current density increases further, cone angle β approaches 0 degrees (180 degrees from original magnetization 4m) where there is a maximum increase in WG reluctance because of magnetization 4m1 direction is essentially in direct opposition to $H_{WG}$. It should be understood that with large cone angles (i.e. ~90 degrees) for α and β, the MAMR effect is substantial. Both of the spin flipping assist effect and MAMR effect may occur during the precessional state with cone angle β. However, there is essentially no MAMR effect when cone angle β approaches 0 degrees since β is too small to create a useful RF field on bit magnetization 9. In other words, there is typically a trade off between a larger MAMR effect (with larger cone angle β) and an optimum increase in WG reluctance and MP field enhancement as the cone angle β approaches 0 degrees.

Because of the additive spin torque from SP layers on opposite sides of FGL 4, FGL magnetization is flipped to a cone angle β with about half the current density required in STO devices where a SP layer is formed on only one side of the FGL. Since only half the current is needed compared with existing STO designs, this means the STO device is expected to be 75% cooler since heating is proportional to power ($I^2R$) where R is resistance in the conductor. In addition, there is better thermal conduction from FGL 4 to contact layer 59 and lead 58 that will enable a lower operating temperature than when $I_a$ is conducted across the STO from MP 14 to HMTS 17, or in the reverse direction as in prior art designs. The demagnetization field (not shown) from the contact layer 59/lead 58 may also oppose $H_{WG}$ and assist the switching of FGL magnetization thereby providing a greater degree of FGL flipping at a given $I_a+I_b$ current density.

Each of SPRL1 3 and SPRL2 5 may be single layer or multilayer film, and is preferably a non-magnetic metal with a long spin diffusion length such as Cu, Ag, or Au or an alloy thereof with Cr or Mo for improved robustness against electromigration so that current polarized by the adjoining first SP layer 2 and second SP layer 6, respectively, does not encounter strong spin-flip scattering in the first and second SPRL. SPRL1 an SPRL2 also prevent strong ferromagnetic coupling between adjoining magnetic layers. In other embodiments, one or both of SPRL1 and SPRL2 may be a metal oxide layer. However, metal oxide spacers are generally less preferred because they raise a reliability concern.

Each of SP layers 2, 6, and FGL 4 is typically a single layer or multilayer that is one or more of Co, Fe, Ni, or alloys thereof such as CoFe, NiFe, CoFeNi, or alloys with B, Pt, Pd, Ru, or Cr, or laminates of one or more of Co, Fe, and Ni with Pt or Pd including $(Fe/Pt)_n$, $(Co/Pt)_n$, $(Fe/Pd)_n$, and $(Co/Pd)_n$ where n is a lamination number. In a second embodiment described below, the FGL may be comprised of two sub-layers and a non-magnetic material between the two sub-layers to enhance reliability by better thermal conduction or having better thermal migration robustness.

Figure 7A:
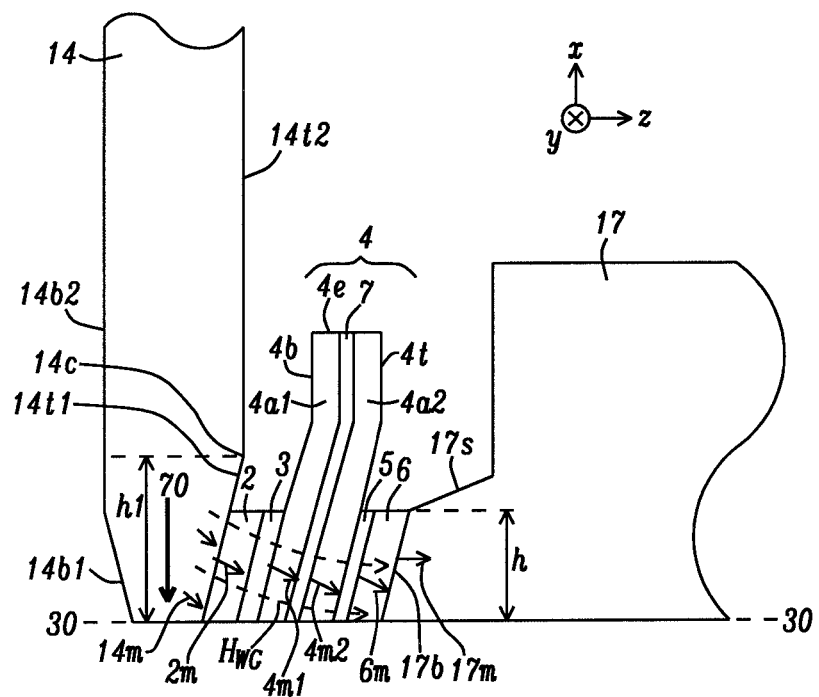
FIG. 7A depicts a second embodiment of the present disclosure wherein the FGL in FIG. 6A is modified to include a metal insertion layer.

According to the second embodiment shown in FIG. 7A where all features of the first embodiment are retained except a non-spin preserving layer also referred to as a spin killing layer 7 is inserted between a first FGL sub-layer 4a1 and second FGL sub-layer 4a2. Both FGL sub-layers and the spin killing layer extend from the ABS 30-30 to backside 4e and replace FGL 4 described earlier. Each of the FGL sub-layers is typically a single layer or multilayer with a composition described previously for FGL 4. The spin killing layer is preferably one of Ta, W, Pt, Pd, Ir, Rh, Cr, or Ti.

Figure 7B:
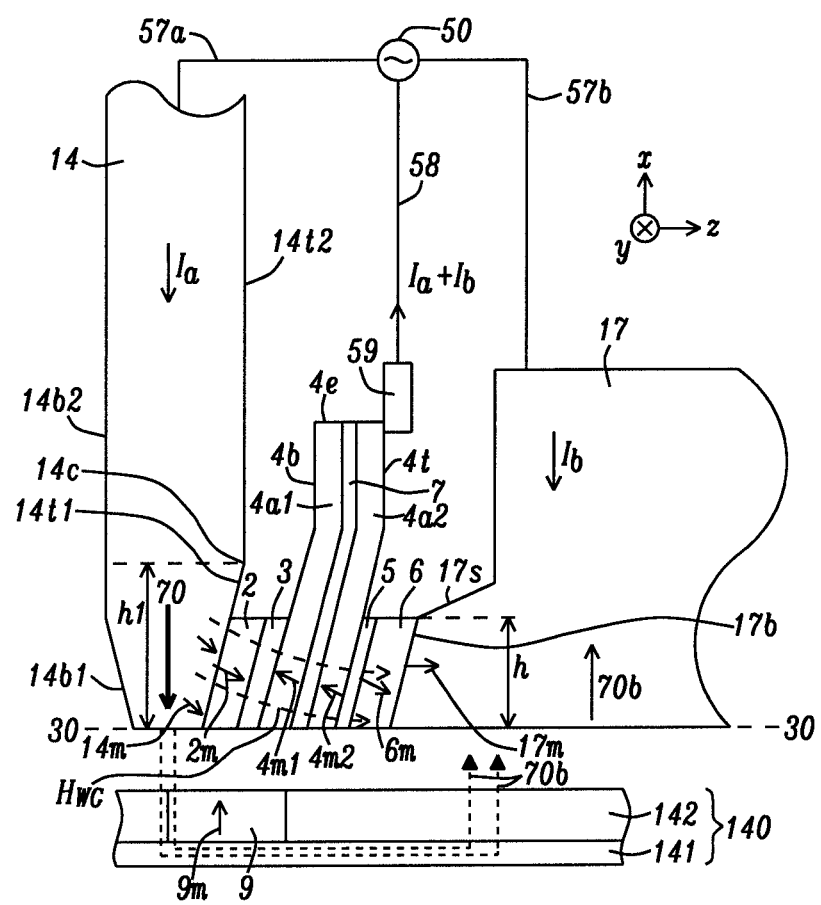
FIG. 7B shows that current may be applied across a SP layer on one or both sides of the FGL to independently switch upper and lower FGL portions.

Referring to FIG. 7B, the STO device of the second embodiment employs a similar current flow shown in FIG. 6B where $I_a$ proceeds from dc source 50 through lead 57a to MP 14 and then through first SP layer 2 to SPRL1 3 to FGL 4, and $I_b$ proceeds through lead 57b to HMTS 17 and then through second SP layer 6 to SPRL2 5 to FGL 4. This embodiment provides an additional benefit in the flexibility of switching FGL sub-layer 4a1 independently from FGL sub-layer 4a2 because of the spin killing layer 7 between the FGL sub-layers. In particular, spin torque generated by the first SP layer is responsible for driving FGL magnetization 4m1 into a precessional state that in turn provides one or both of a MAMR effect and a spin flip enhancement to WG reluctance and write field 70. The spin polarized $I_a$ entering FGL 4 from the MP side is blocked from entering FGL sub-layer 4a2 and applies no spin torque to FGL magnetization 4m2. The spin polarized $I_a$ returns to dc source through contact layer 59 and lead 58.

Meanwhile, spin torque generated by the second SP layer 6 is responsible for driving FGL magnetization 4m2 into a precessional state that in turn provides one or both of a MAMR effect and a spin flip enhancement to WG reluctance and write field 70. The spin polarized $I_b$ entering FGL 4 from the TS side is blocked from entering FGL sub-layer 4a1 and applies no spin torque to FGL magnetization 4m1. The spin polarized $I_b$ returns to dc source through contact layer 59 and lead 58. Thus, $I_a$ through lead 57a may have a different current density than $I_b$ through lead 57b. Accordingly, if the former has a greater current density than the latter, the spin torque on FGL magnetization 4m1 may provide primarily a spin flip effect to increase WG reluctance and write field 70 while spin torque on FGL magnetization 4m2 may result in primarily a MAMR effect, for example.

In all embodiments, current density for providing one or both of a STRAMR effect and a MAMR effect is expected to be substantially less than that required in existing STO designs for a significant improvement in device reliability because of less electromigration in metal spacers and a reduced risk of other breakdown mechanisms. Alternatively, a greater degree of FGL flipping is achieved while maintaining the same current density used in prior art designs. An improved bit error rate (BER) and higher area density capability (ADC) performance is also realized with improved writability.

Figure 8A:
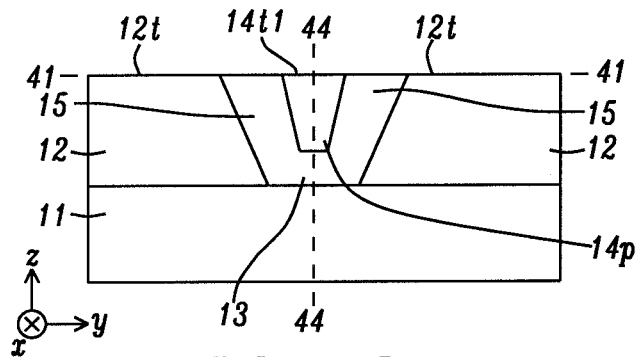
Figure 8B:
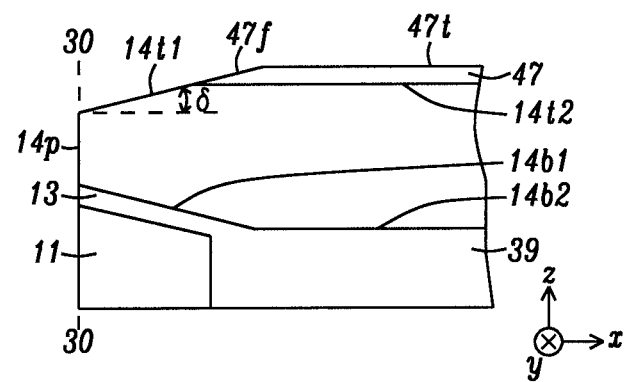

The present disclosure also encompasses a process sequence for fabricating a STO device according to an embodiment described herein and is provided in FIG. 8A through FIG. 19. The partially formed MAMR writer structure including MP tip 14p that adjoins side gaps 15 and leading gap 13 in FIG. 8A is provided according to a conventional process sequence. Side shield top surfaces 12t are coplanar with a trailing edge of the MP tapered trailing side 14t1 at plane 41-41, which is orthogonal to the subsequently formed ABS plane. FIG. 8B shows the down-track cross-sectional view at plane 44-44 in FIG. 8A. MP tapered trailing side 14t1 has a taper angle S and is coplanar with a tapered front side 47f of dielectric layer 47 made of $Al_2O_3$ or $SiO_2$ and with top surface 47t that is formed on MP top surface 14t2. Note that the eventual ABS, hereafter referred to as ABS plane 30-30, is not determined until a lapping process is performed after all layers in the writer structure are formed.

Figure 9A:
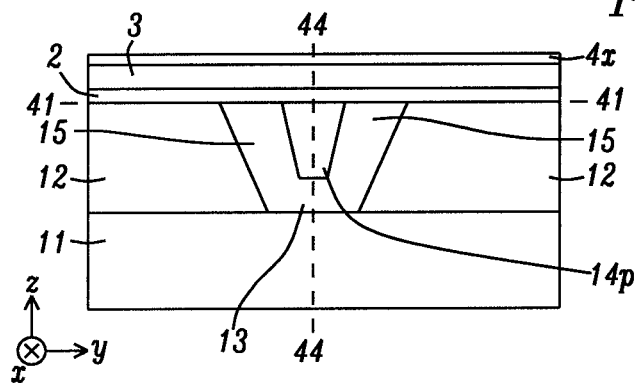
Figure 9B:
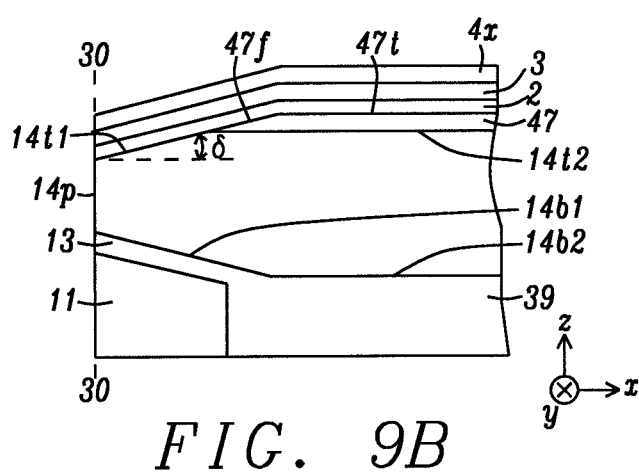

In FIG. 9A, a partial STO stack of layers including first SP layer 2, SPRL1 3, and a sacrificial FGL 4x are sequentially deposited on the MP tapered trailing side 14t1. In FIG. 9B, a down-track cross-sectional view at plane 44-44 shows the aforementioned STO layers are also formed on dielectric layer 47, and are preferably conformal to the underlying topography.

Figure 10:
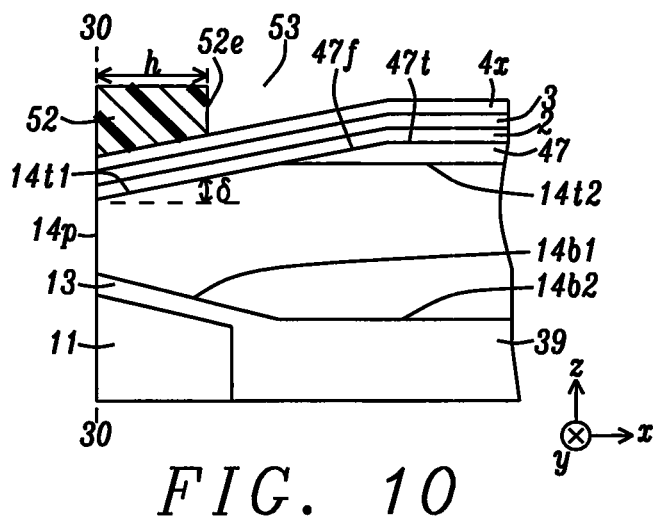

As shown in FIG. 10, a first photoresist layer is coated on the partial STO stack of layers, and is patternwise exposed and developed to provide a photoresist mask 52 having a backside 52e at a height h from the ABS plane 30-30. Opening 53 behind the photoresist mask exposes a portion of FGL 4x. It should be understood that the photoresist mask and subsequent photoresist masks in later drawings may extend to an opposite side of the ABS plane with respect to MP top surface 14t2, but the extended portions are not shown in the drawings in order to focus on key aspects of the disclosure relating to formation of a STO device above MP trailing side 14t1 and MP top surface.

Figure 11:
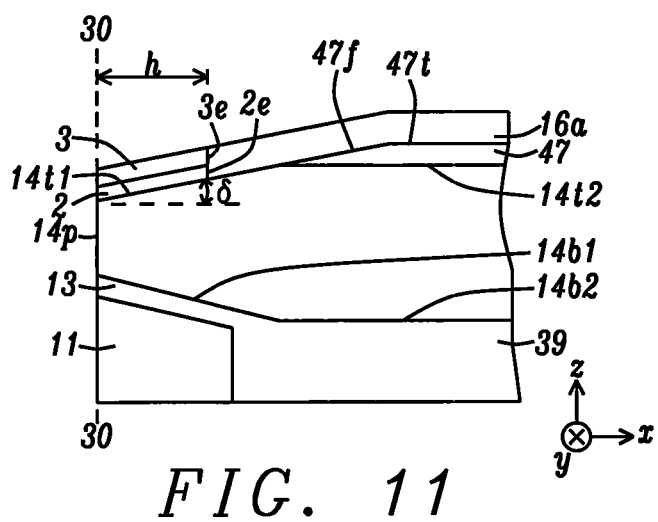

In FIG. 11, the partially formed STO device is depicted after opening 53 is etch transferred through FGL 4x, first SPRL 3, and first SP layer 2 using a reactive ion etch (RIE) or ion beam etch (IBE) process that stops on MP trailing side 14t1 and dielectric layer top surface 47t. The photoresist mask and sacrificial FGL 4x are removed during the RIE or IBE to leave a partial STO stack of the first SP layer and SPRL1 extending from the ABS plane 30-30 to a backside 2e and 3e, respectively, at height h. Thereafter, WG layer 16a is deposited as a refill on the MP trailing side and dielectric layer top surface.

Figure 12:
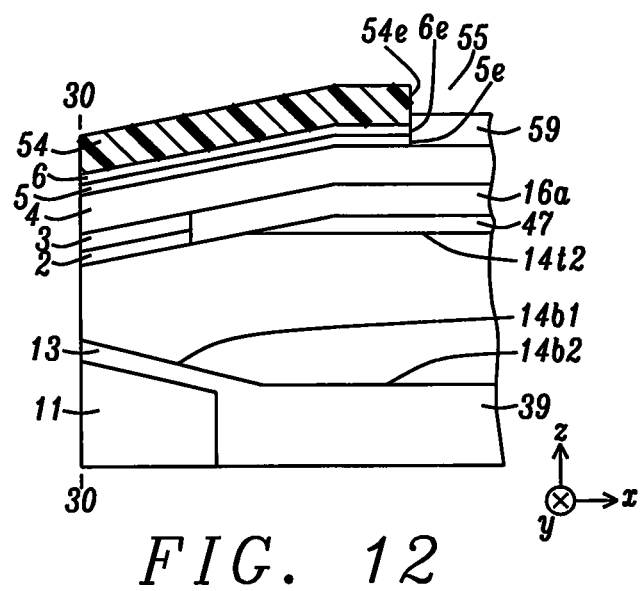

Referring to FIG. 12, a down-track cross-sectional view at plane 44-44 is depicted for the partially formed STO device after FGL 4, SPRL2 5, and second SP layer 6 are sequentially deposited on SPRL1 3 and WG layer 16a. A second photoresist is coated on the second SP layer, and then patternwise exposed and developed by a conventional lithography process to yield photoresist mask 54 with backside 54e and opening 55 behind the photoresist mask. The opening is transferred through the second SP layer and SPRL2, and stops on a top surface of FGL thereby forming second SP layer backside 6e and a SPRL2 backside 5e. Next a contact layer 59 is deposited on a back portion of FGL 4 in opening 55 using a lift-off process.

Figure 13:
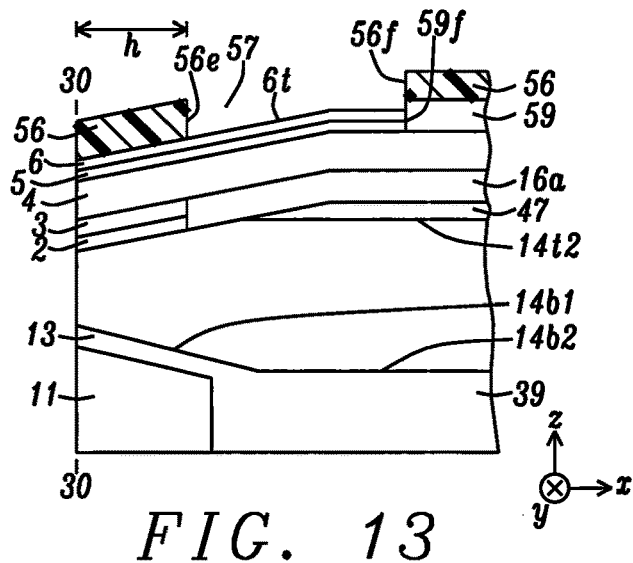

With regard to FIG. 13, the second photoresist mask is removed by a conventional method, and then a third photoresist layer is coated followed by patternwise exposure and development to provide photoresist mask 56 having a front portion extending from the ABS plane 30-30 to a backside 56e at height h, and a back portion formed on contact layer 59 and with front side 56f above front side 59f of the contact layer. Opening 57 separates the photoresist mask front and back portions and exposes a portion of second SP layer top surface 6t.

Figure 14A:
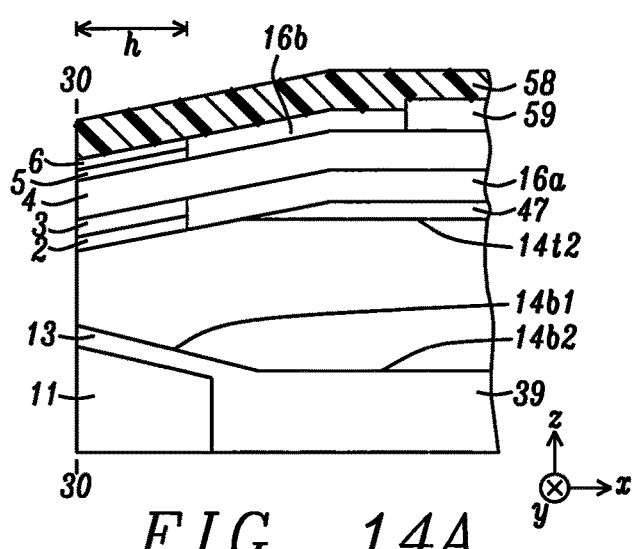

In FIG. 14A, a down-track cross-sectional view of the partially formed STO device in FIG. 13 is shown after a RIE or IBE process removes exposed portions of second SP layer 6 and SPRL2 5 and stops on FGL 4. Then, a WG layer 16b is deposited in opening 57 and the third photoresist mask is removed. A fourth photoresist layer is coated, patternwise exposed, and developed to yield a photoresist mask 58 that extends from the ABS plane 30-30 and over second SP layer 6, WG layer 16b, and contact layer 59 at the center plane. The center plane 44-44 is shown in the top-down view in FIG. 14B where a front portion of photoresist mask 58 has a first front side 58f1 at the ABS plane, extends to height h, and has a width w between sides 58s that are equidistant from the center plane. A back portion of the photoresist mask has front side 58f2 at height h, and has sufficient width to cover WG layers 16a-16b, and FGL 4 above MP sides 14s and MP corners 14c that are connected by backside 14x indicating a back end of a front portion of MP 14. Thus, the front portion of the photoresist mask will be used to define the width of the STO device between the ABS plane and height h.

Figure 14B:
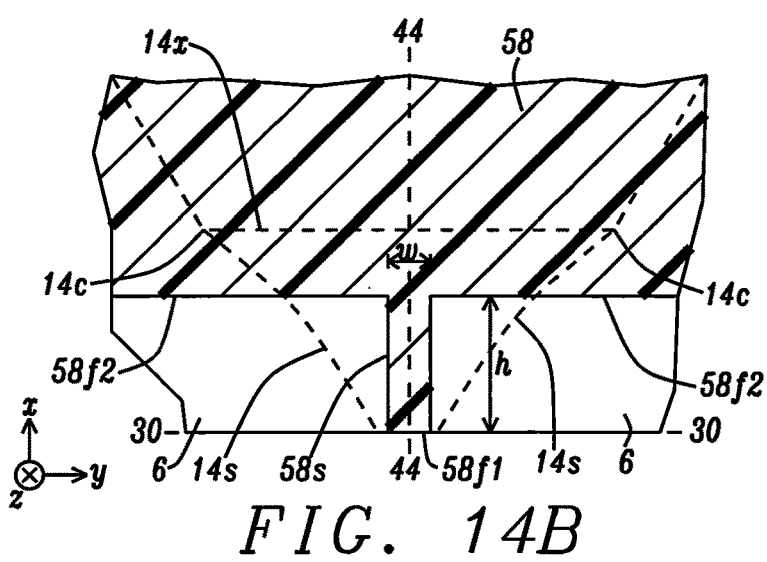
FIG. 14B is a top-down view showing an intermediate step in forming a cross-track width in the STO stack of layers in FIG. 12A.
Figure 15A:
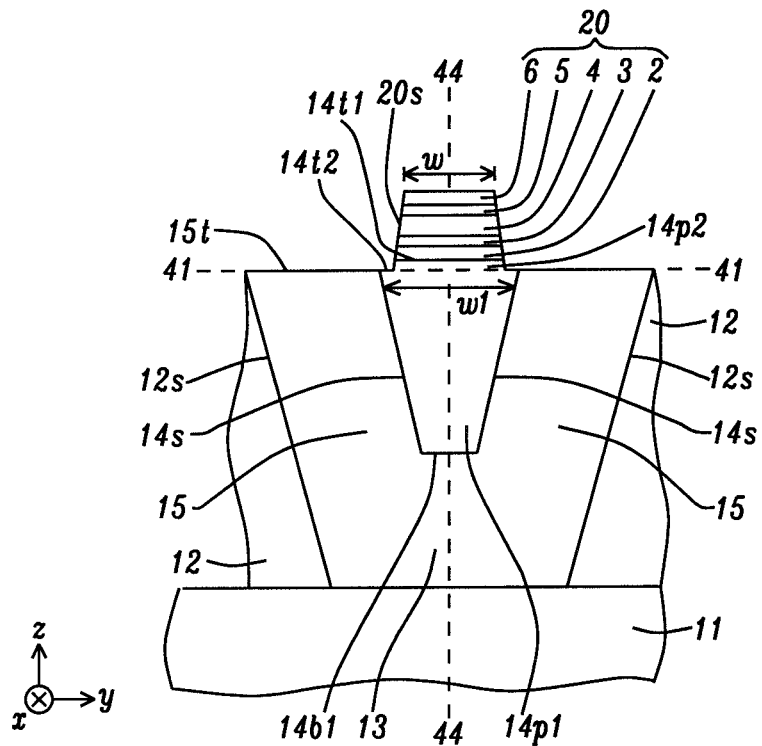
FIG. 15A is an ABS view and FIG. 15B is a top-down view following an etch step that forms a sidewall on the STO stack of layers and extends into an upper portion of the MP according to an embodiment of the present disclosure.

FIG. 15A depicts the STO stack of layers 20 from an ABS view after the openings above exposed portions of second SP layer 6 adjacent to photoresist mask sides 58s in FIG. 14B are transferred through the STO stack using a RIE or IBE process. The etch also removes an upper portion of the MP tip at the MP trailing side and stops at MP trailing side 14t2 and side gap top surface 15t at plane 41-41. Accordingly, the upper MP tip portion 14p2 having width w is formed between first SP layer 2 and plane 41-41, and the lower MP tip portion 14p1 has a width w1 at MP trailing side 14t2 where w1>w, and is below plane 41-41. As mentioned earlier, the RIE or IBE is advantageously employed to self-align the upper MP tip portion 14p2 with the STO width w without sacrificing MP volume behind height h in order to maintain writability. It should be understood that the etch may generate a STO sidewall 20s that is not vertical with respect to plane 41-41 such that the width of second SP layer 6 may be less than w, and the width of first SP layer 2 may be greater than w at the ABS. However, the width of the upper MP tip portion at top surface 14t1 is still less than w1.

Figure 15B:
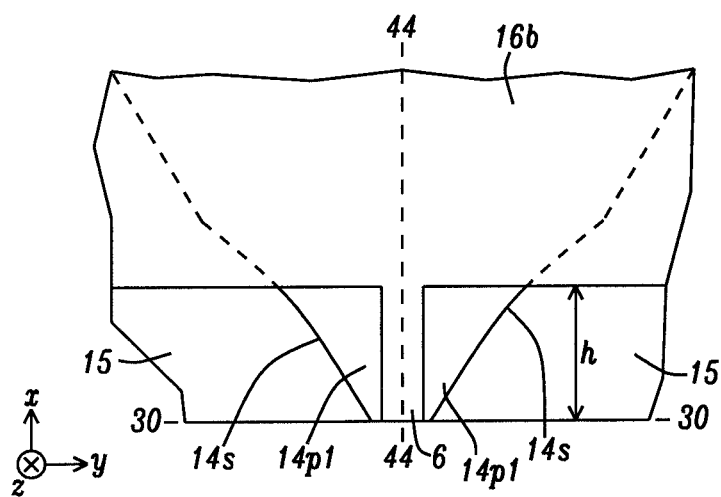

Referring to FIG. 15B, a top-view of the STO device in FIG. 15A is illustrated after the photoresist mask is removed. MP tip portion 14p1 is shown below second SP layer 6 (and other STO layers not shown) and extends to sides 14s on each side of center plane 44-44. Side gaps 15 adjoin each MP side 14s.

Figure 16:
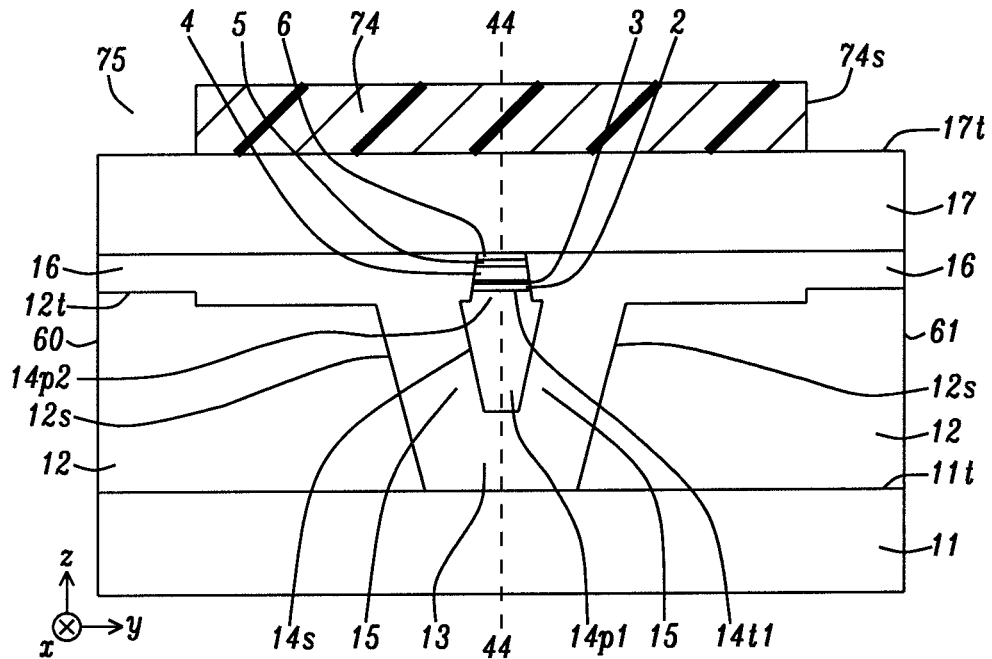
FIG. 16 is an ABS view showing an intermediate step in forming a cross-track width in a WS that has been deposited on the STO stack and a WG layer.

In FIG. 16, an ABS view of the partially formed writer structure is shown after WG layer 16 is deposited to refill etched regions adjacent to STO sidewalls, and then HMTS 17 is deposited on WG layers 16, 16b. In some embodiments, all WG layers 16, 16a, and 16b may be comprised of the same material and may be depicted as WG layer 16. Thereafter, a fifth photoresist layer is coated on the HMTS, and is patternwise exposed and developed to form photoresist mask 74 having sides 74s, and openings 75 that expose portions of HMTS top surface 17t on each side of the center plane 44-44.

Figure 17:
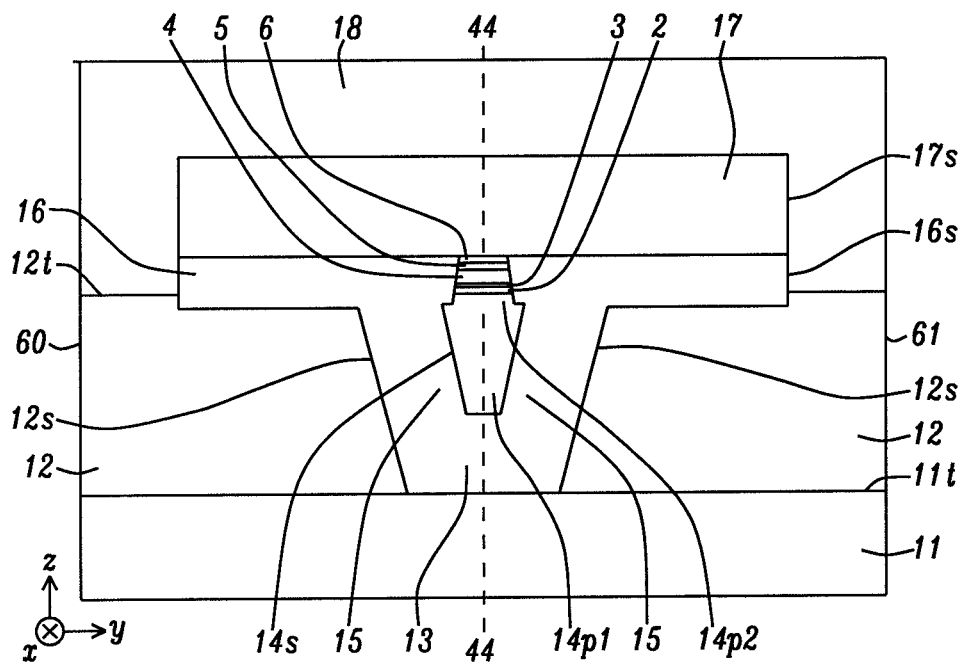
FIG. 17 is an ABS view and FIGS. 18-19 are down-track cross-sectional views showing deposition of a trailing shield on the WS, and then forming a backside on the WS and trailing shield according to an embodiment of the present disclosure.

Referring to FIG. 17, another RIE or IBE is employed to transfer opening 75 through exposed portions of the HMTS 17 and WG layer 16, and stops on side shield top surface 12t at plane 41-41 thereby generating HMTS side 17s and WG side 16s on each side of plane 44-44. Then, the photoresist mask is removed and WS 18 is deposited to fill opening 75 and cover the HMTS top surface 17t.

Figure 18:
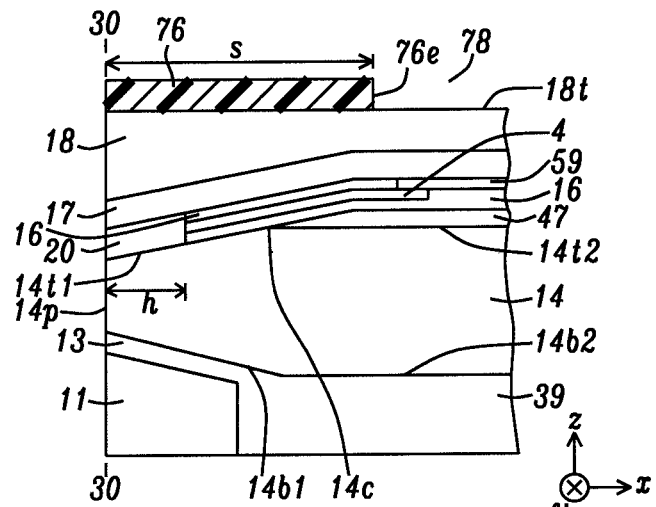

Referring to FIG. 18, a sixth photoresist layer is coated on WS 18, and then patternwise exposed and developed to form photoresist mask 76 having a backside 76e at height s from the ABS plane 30-30 where s is generally larger than height h described earlier. Opening 78 exposes WS top surface 18t behind the photoresist mask.

Figure 19:
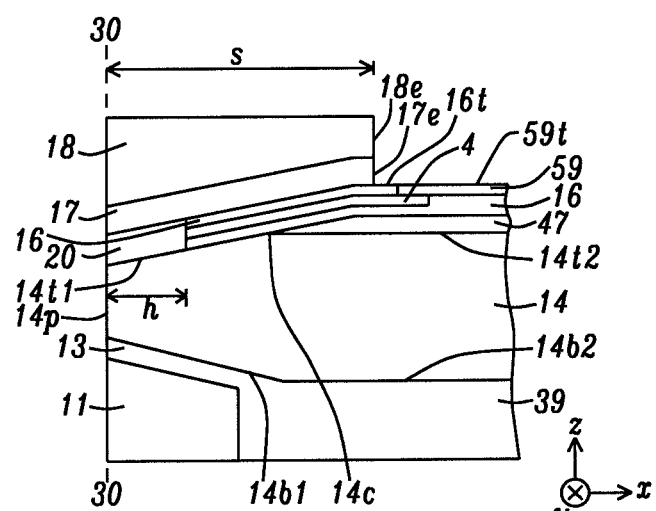

FIG. 19 depicts the partially formed writer structure in FIG. 18 after a RIE or IBE process is performed to transfer opening 78 through exposed regions of WS 18 and then HMTS 17, and stops at WG top surface 16t and contact layer top surface 59t thereby forming HMTS backside 17e and WS backside 18e at height s from the ABS plane 30-30. Thereafter, a conventional process flow is followed to complete the writer structure. According to one embodiment, a combined read-write head 1 shown in FIG. 4 is formed.

While the present disclosure has been particularly shown and described with reference to, the preferred embodiments thereof, it will be understood by those skilled in the art that various changes in form and details may be made without departing from the spirit and scope of this disclosure.

We claim:

1. A perpendicular magnetic recording (PMR) writer with a spin torque reversal assisted magnetic recording (STRAMR) structure, comprising:
   (a) a main pole (MP) that is configured to generate a magnetic (write) field which is directed through a pole tip at an air bearing surface (ABS), and a write gap (WG) field flux in a down-track direction from a MP trailing side across the WG and a spin torque oscillator (STO) device into a trailing shield (TS);
   (b) the trailing shield (TS) with a side at the ABS, and a bottom surface facing the MP; and
   (c) the STO device, comprising:
      (1) a first spin polarization layer (SP1) that adjoins the MP trailing side, and a second spin polarization layer (SP2) that contacts the TS bottom surface;
      (2) first and second spin preserving layers (SPRL1 and SPRL2), wherein SPRL1 adjoins the SP1 on a side opposite to the MP trailing side, and SPRL2 contacts the SP2 on a side opposite to the TS bottom surface; and
      (3) a field generation layer (FGL) formed between SPRL1 and SPRL2, and having a front side at the ABS and a backside at a height (h2), and with a magnetization pointing substantially in the direction of the WG field flux in the absence of an applied current, and wherein the STO device is configured so that when a current ($1_a$) of sufficient magnitude from a direct current (dc) source is applied from the MP trailing side across the SP1 and SPRL1 to the FGL and returns through a lead to the dc source, and a current ($1_b$) from the dc source is applied from the TS bottom surface across the SP2 and SPRL2 to the FGL and returns through the lead to the dc source, the SP1 and SP2 exert an additive spin torque on the FGL to cause a FGL precessional state that produces one or both of a radio frequency field on a magnetic medium to reduce a write field needed to switch a bit magnetization therein, and flips the FGL magnetization to a direction substantially antiparallel to the WG field flux thereby increasing reluctance in the WG, which enhances the write field.

2. The PMR writer of claim 1 wherein each of the SP1, SP2, and the FGL is a single layer or multilayer that is one or more of Co, Fe, Ni, or alloys thereof including CoFe, NiFe, and CoFeNi, or alloys with B, Pt, Pd, Ru, or Cr, or laminates of one or more of Co, Fe, and Ni with Pt or Pd.

3. The PMR writer of claim 1 wherein each of SPRL1 and SPRL2 is Cu, Ag, or Au, or an alloy thereof with Cr or Mo.

4. The PMR writer of claim 1 wherein each of the SP1, SP2, SPRL1, and SPRL2 has a front side at the ABS and a backside at height h where h<h2.

5. The PMR writer of claim 4 wherein height h is equal to a TS throat height.

6. The PMR writer of claim 4 wherein the MP trailing side is tapered and extends from the ABS to a height h1 where h1>h, and h1<h2, and wherein h1 is at a corner where the MP trailing side connects with a MP top surface that is aligned orthogonal to the ABS.

7. The PMR writer of claim 6 wherein the FGL has a top surface facing the TS, and a bottom surface facing the MP, and wherein the FGL top and bottom surfaces are substantially conformal to the MP trailing side and MP top surface.

8. The PMR writer of claim 7 wherein the STO device is further comprised of a contact layer formed on the FGL top surface proximate to a backside of the FGL, and connected to the lead.

9. The PMR writer of claim 1 wherein the FGL has a configuration wherein a first FGL sub-layer (FLG1) contacts the SPRL1, a second FGL sub-layer (FGL2) adjoins the SPRL2, and there is a non-spin preserving layer between FGL1 and FGL2 to enable a FGL1 magnetization to be switched independently from a FGL2 magnetization when $1_a$ is from the MP trailing side to FGL1, or $1_b$ is from the TS bottom surface to FGL2, respectively.

10. The PMR writer of claim 9 wherein the non-spin preserving layer is one of Ta, W, Pt, Pd, Ir, Rh, Cr, or Ti.

11. The PMR writer of claim 9 wherein $1_a$ is unequal to $1_b$.

12. The PMR writer of claim 1 wherein the MP has a MP tip at the ABS wherein an upper MP tip portion has a first width (w) substantially equal to a width of the STO device at the ABS, and a bottom MP tip portion having a second width (w1) at a top surface thereof where w1>w.

13. The PMR writer of claim 1 wherein h2 is from 50 nm to 1000 nm from the ABS.

14. A head gimbal assembly (HGA), comprising:
(a) the PMR writer of claim 1; and
(b) a suspension that elastically supports the PMR writer, wherein the suspension has a flexure to which the PMR writer is joined, a load beam with one end connected to the flexure, and a base plate connected to the other end of the load beam.

15. A magnetic recording apparatus, comprising:
(a) the HGA of claim 14;
(b) a magnetic recording medium positioned opposite to a slider on which the PMR writer is formed;
(c) a spindle motor that rotates and drives the magnetic recording medium; and
(d) a device that supports the slider, and that positions the slider relative to the magnetic recording medium.

* * * * *